Patented Mar. 24, 1925.

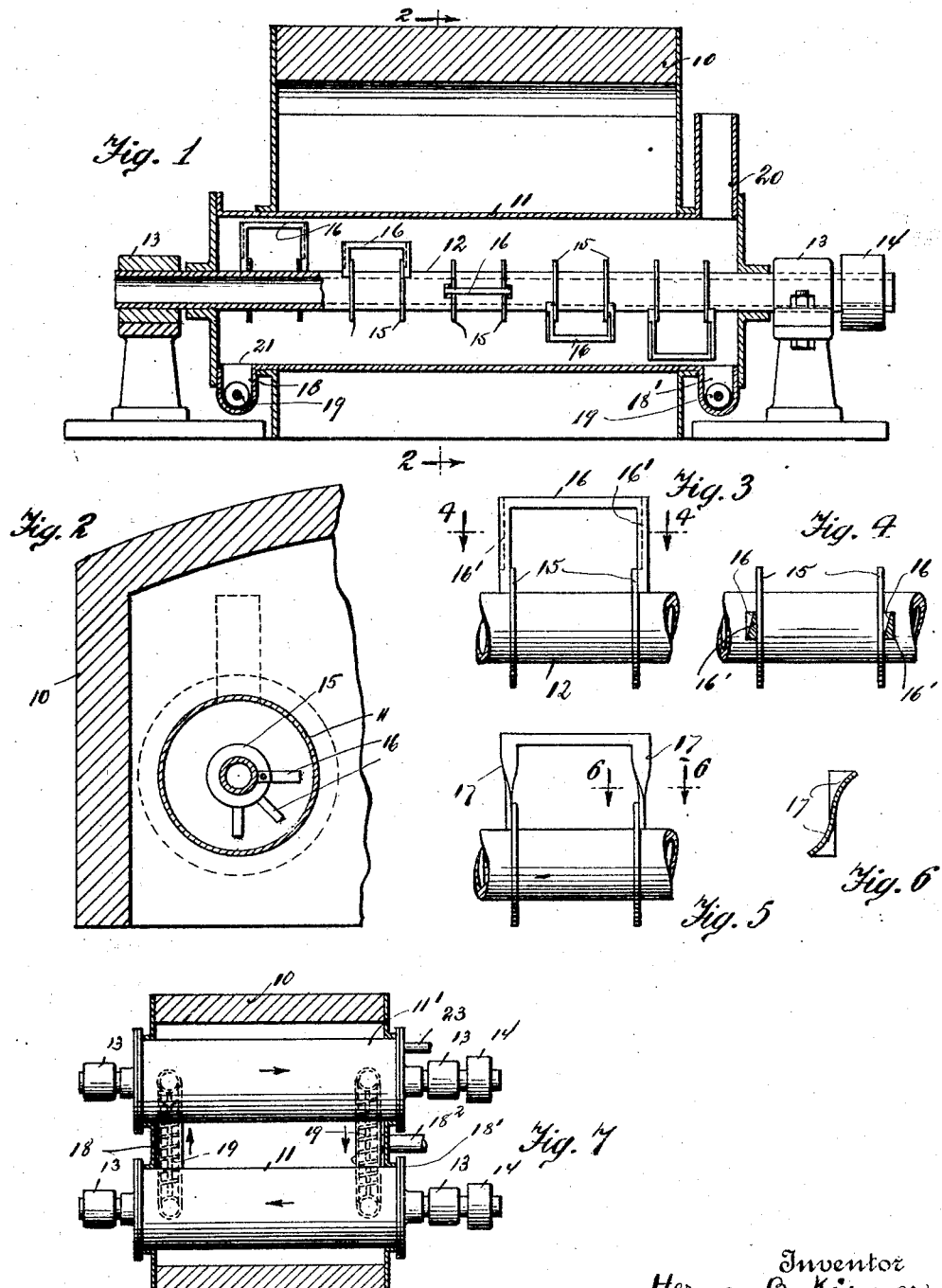

1,530,949

UNITED STATES PATENT OFFICE.

HERMAN B. KIPPER, OF MUSKEGON, MICHIGAN.

PROCESS OF AND APPARATUS FOR SPEEDING AND AIDING THE ABSORPTION OR EVOLUTION OF GASES.

Application filed December 28, 1920. Serial No. 433,561.

*To all whom it may concern:*

Be it known that I, HERMAN B. KIPPER, citizen of the United States of America, residing at Muskegon, in the county of Muskegon and State of Michigan, have invented certain new and useful Improvements in Processes of and Apparatus for Speeding and Aiding the Absorption or Evolution of Gases, of which the following is a specification.

The present invention has for its object to provide an apparatus for and process of effectively speeding and aiding the absorption or evolution of gases by substances chemically reactive toward these gases at the operating temperature.

There exist many chemical reactions of great commercial value based on the absorption of gases by, or the reaction of gases with other solids or fused substances. The commercial value of such reactions is, however, negatived by the slow speed at which absorption or evolution generally has been found to occur at practical operating temperatures.

For instance, a great many attempts have been made to absorb nitrogen by alkaline salts mixed with carbon dust and finely divided iron. During the recent war the United States Government carried on extensive experimentations along these lines in order to secure nitrogen in combined form from which to make nitric acid for explosives. The commercial value of the reactions by means of which ammonia (as an intermediary product) is formed, has been found to be of little value in competition with other processes owing to the excessive cost of carrying out the reactions in question.

In order to increase the speed of absorption of nitrogen by the reactive substances, I subject according to my invention, these substances to the blows or impacts of rapidly revolving hammers during the period of reaction, and surround these substances with nitrogen during the said period. Similarly in order to aid in the evolution of ammonia, the nitrogenous substances formed are subjected to the impacts of hammers during the treatment of these substances with superheated steam.

At this point and in this connection it might be well to accentuate the great difference brought about in the substance of the chemical reactions involved by the step of merely mixing during the period of reaction, as compared with the step of grinding and mixing during the same period.

The step of mixing, of course, carries the material from the cold to the hotter zones of the furnace and for many substances in their reactions with one another thereby no doubt increases the speed of the reaction. It is, however, the step of grinding during the reaction that absolutely establishes the value of my process. Materials of the nature of those with which we are dealing tend to aggregate at higher temperatures and while in the semi-fused state. Mixing tends only to increase such aggregation with consequent diminution in the speed of absorption. On the other hand, if the particles are prevented from aggregation by being separated and ground by hammer impacts the speed of reaction is not only very greatly increased, but also brought far nearer to completion in a given capacity apparatus. Mixing alone does not increase the two foregoing factors, and in fact in reactions of nitrogen with these solids, or semifused materials, the reaction may be very greatly retarded by mixing. It is upon these findings that the success of my new process rests.

To substantiate my statement that mixing alone does not increase the speed of absorption I quote the following from the report of Major Charles O. Brown, Ordnance Dept. U. S. A. contained in the November 1919 issue of the Journal of Industrial and Engineering Industry.

"A complete unit with a horizontally tipped rotating retort for making cyanide was set up to determine if the stationary vertical retort formerly used in this work should be abandoned. This work indicated several slight advantages over the stationary retort, but the advantages were not so positive as to its use."

Nitrogen is absorbed by a mixture of sodium carbonate, finely divided carbon and iron to form various nitrogen compounds as sodium cyanide and sodium cyanamide. I have found after very extensive experimentation that the slowness of this reaction was due to the semi-fused condition of the sodium salts at the temperatures of reactions. This condition causes an aggregation or agglomeration of the reaction materials thereby decreasing the surface exposed to reaction with the nitrogen. Consequently the actual speed of absorption or of reaction is greatly reduced. Mixing and furnacing in a rotary cylinder do not aid in increasing the speed of the reaction. I have found, on the other hand, that by the employment of rapidly rotating hammers to produce grinding and mixing within the cylinder simultaneously with the furnacing and absorption of the reaction substances, the substances are kept in a very finely divided state and the speeds of the reactions in question are greatly increased.

My invention will be more fully understood by reference to the accompanying drawing in which the apparatus for carrying out my new process is illustrated; Fig. 1 being a vertical section of the apparatus; Fig. 2 a cross section on line 2—2 of Fig. 1; Fig. 3 is an elevation of an individual hammer; Fig. 4 is a section on line 4—4 of Fig. 3; Fig. 5 is an elevation of a modified hammer; Fig. 6 is a section on line 6—6 of Fig. 5; and Fig. 7 is a reduced sectional top plan view of my apparatus.

The apparatus consists of a furnace 10 through which extend two cylinders 11 11' arranged parallel to one another. Extending through each cylinder is a hollow shaft 12 rotatively borne in bearings 13 and driven from a suitable source through pulleys 14. On each of the shafts are mounted a plurality of disks 15. Pivotally attached to each pair of adjacent disks 15 of each cylinder is a hammer 16. These hammers are each in form of an inverted U-shaped bar, the sides of which are slightly bevelled as at 16' (Figs. 3 and 4), or twisted as at 17 in Figs. 5 and 6. The two cylinders are connected at their ends through pipes 18, 18' in which spirals 19 are provided. The cylinder 11 is provided with a charge opening 20 through which the material to be treated is fed into the cylinder 11. The shafts may be cooled by circulating water therethrough.

Instead of making the hammers of solid bars the same may be made of heavy iron pipes bent to U form and coupled to the shafts 12 so that the water cooling the shafts may circulate through said hammers to cool the latter also.

The hammers may be attached to the shafts directly instead of through the disks, by means of chains.

The process is carried out in the following manner:

To make ammonia I pass nitrogen through a mixture of finely divided sodium carbonate (other alkali or alkali earth metal may replace sodium or be used in conjunction with the same) carbon and iron oxide previously fed into the cylinder 11. This cylinder is externally heated in the furnace to a temperature above 150° C. as between 500° and 1200° C. During the rotation of the shaft 12 in said cylinder the material in addition to the rotary motion it receives by the impact of the hammers 16 is forced or fed toward the discharge end of said cylinder owing to the bevelled or twisted sides thereof acting like a spiral. The reaction material passes through the discharge opening 21 and spiral 19 into the second cylinder 11' in which it is operated in a similar manner. Through this second cylinder 11' steam is passed by a pipe 23. The steam causes the nitrogen compounds formed to be decomposed and to form ammonia somewhat according to the following reaction:

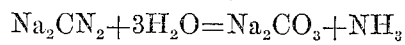

$$Na_2CN_2 + 3H_2O = Na_2CO_3 + NH_3$$

The ammonia is then drawn off and the solid materials are returned to the first cylinder 11 through the pipe 18' and the second spiral leading from the discharge end of the cylinder 11'. As the coke or other materials are used up by loss or by reaction they are replaced by the same spiral leading from the second cylinder 11' to the first cylinder. Fresh material may be entered into the cylinder through a feed opening $18^2$ provided in the pipe 18'. The ammonia is freed from dust issuing from the reaction materials by being drawn through a pipe containing a wire centrally located and highly electrically charged. The nitrogen gas leaving the cylinder is similarly freed of dust particles. The residual nitrogen is pumped back through the system until the carbon monoxide content becomes excessively high. The ammonium gas formed is led into a chamber and mixed with hydrochloric acid gas to form ammonium chloride.

The hydrochloric acid gas is produced also in a cylinder with rapidly swinging hammers or in other words in an apparatus similar to the one described. It is formed either by the action of nitre cake or salt according to the following reaction:

$$NaHSO_4 + NaCl Na_2SO_4 + HCl$$

or by the reaction of sulphur dioxide gas, steam and oxygen (air) on salt according to the following reaction:

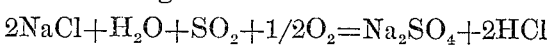

$$2NaCl + H_2O + SO_2 + 1/2 O_2 = Na_2SO_4 + 2HCl$$

These reactions are well known and are at present commercially utilized. It is the speeds of the reactions that are greatly increased by my process.

What I claim and desire to secure by Letters Patent is:—

1. In a process of speeding and aiding the absorption of nitrogen gas by sodium carbonate, carbon and iron at temperatures of from 500° to 1200° C. to produce sodium nitrogenous compounds, the steps of subjecting these substances to simultaneous grinding and mixing action during the period of reaction and surrounding said substances by nitrogen gas during the said period.

2. In a process of speeding and aiding the absorption of nitrogen gas by sodium carbonate, carbon and iron at temperatures of from 500° to 1200° C. to produce sodium nitrogeneous compounds, the steps of subjecting these substances to grinding and mixing actions by the blows of rapidly rotating hammers during the period of reaction and surrounding said substances by nitrogen gas during the said period.

3. During the production of chemical reaction and during the simultaneous grinding of the materials entering into the reaction by means of metal pieces carried on a rapidly rotating shaft the step of externally heating the apparatus containing said materials and rotating shaft.

4. During the production of chemical reaction and during the simultaneous grinding of the materials entering into the reaction by means of metal pieces carried on a rapidly rotating shaft the step of heating the apparatus containing said materials and rotating shaft.

5. During the production of chemical reaction and during the simultaneous grinding of the materials entering into the reaction by means of metal pieces carried on a rapidly rotating shaft the step of externally heating to above 150° C. the apparatus containing said materials and rotating shaft.

6. During the production of chemical reaction and during the simultaneous grinding of the materials entering into the reaction by means of metal pieces carried on a rapidly rotating shaft the step of heating to above 150° C. the apparatus containing said materials and rotating shaft.

7. During the production of chemical reaction and during the simultaneous grinding of sodium carbonate, carbon and iron by means of metal pieces carried on a rapidly rotating shaft and while the above materials are surrounded with nitrogen gas the step of externally heating to from 500° to 1200° C. the apparatus containing said materials and rotating shaft to produce compounds containing sodium, carbon and nitrogen.

8. During the production of chemical reaction and during the simultaneous grinding of sodium carbonate, carbon and iron by means of metal pieces carried on a rapidly rotating shaft and while the above materials are surrounded with nitrogen gas the step of heating to from 500° to 1200° C. the apparatus containing said materials and rotating shaft to produce compounds containing sodium, carbon and nitrogen.

In testimony whereof I affix my signature in presence of two witnesses.

HERMAN B. KIPPER.

Witnesses:
A. N. Mars,
H. E. Jones.